(12) United States Patent
Yamaguchi et al.

(10) Patent No.: US 7,503,383 B2
(45) Date of Patent: Mar. 17, 2009

(54) AUTOMOTIVE AIR CONDITIONING SYSTEM

(75) Inventors: Hiroyuki Yamaguchi, Aichi-gun (JP); Osamu Kobayashi, Chiryu (JP); Eiichi Ogata, Oobu (JP); Isao Kinoshita, Kariya (JP); Timothy Roland, Clarkston, MI (US); Glenn Crocker, Marietta, GA (US)

(73) Assignees: DENSO CORPORATION, Kariya (JP); DENSO International America, Inc., Southfield, MI (US)

( * ) Notice: Subject to any disclaimer, the term of this patent is extended or adjusted under 35 U.S.C. 154(b) by 563 days.

(21) Appl. No.: 11/010,793

(22) Filed: Dec. 13, 2004

(65) Prior Publication Data

US 2005/0126774 A1    Jun. 16, 2005

(30) Foreign Application Priority Data

| Dec. 15, 2003 | (JP) | ............................. 2003-416303 |
| Feb. 5, 2004 | (JP) | ............................. 2004-028825 |

(51) Int. Cl.
    *B60H 1/00*      (2006.01)
(52) U.S. Cl. ......................... 165/204; 165/42; 165/122; 165/202
(58) Field of Classification Search ............. 165/42–44, 165/122, 202, 203, 126
See application file for complete search history.

(56) References Cited

U.S. PATENT DOCUMENTS

| 4,711,295 | A | * | 12/1987 | Sakurai ....................... 165/203 |
| 5,086,628 | A | * | 2/1992 | Hashimoto .................... 62/244 |
| 5,211,604 | A | * | 5/1993 | Fujiki ........................... 454/144 |
| 5,862,677 | A | * | 1/1999 | Kim et al. ...................... 62/244 |
| 5,988,518 | A | * | 11/1999 | Kawai et al. ................ 236/49.3 |
| 6,247,530 | B1 | * | 6/2001 | Mochizuki et al. .......... 165/204 |

(Continued)

FOREIGN PATENT DOCUMENTS

JP      57044510 A    *    3/1982

(Continued)

OTHER PUBLICATIONS

Office Action in corresponding JP Patent Application No. 2004-028825 dated Mar. 19, 2008.

*Primary Examiner*—Cheryl J. Tyler
*Assistant Examiner*—Joseph Corrigan
(74) *Attorney, Agent, or Firm*—Harness, Dickey & Pierce, PLC (57) ABSTRACT

There is provided an automotive air conditioning system comprising a primary blower disposed at a front part of a vehicle having a passenger compartment constituted by a front-seat side space and a rear-seat side space, a case disposed in the front part of the vehicle in such a manner that air is caused to flow from one end to the other end thereof by means of the primary blower and having a lower opening which is opened therein at a lower portion at the other end thereof, a heat exchanger disposed within the case, a scroll case disposed below the case and having opened therein an outlet and an inlet connecting to the lower opening, an centrifugal fan accommodated in the scroll case and having a rotating shaft which is oriented in a substantially vertical direction, a secondary blower having driving means for driving the centrifugal fan, and a rear seat duct connected to the outlet and communicating with the rear-seat side space.

15 Claims, 6 Drawing Sheets

U.S. PATENT DOCUMENTS

| | | | |
|---|---|---|---|
| 6,422,309 B2 * | 7/2002 | Vincent | 165/204 |
| 6,568,468 B1 * | 5/2003 | Uemura et al. | 165/203 |
| 6,640,890 B1 * | 11/2003 | Dage et al. | 165/203 |
| 6,675,598 B2 * | 1/2004 | Kaneura et al. | 62/244 |
| 6,915,650 B2 * | 7/2005 | Ito et al. | 62/244 |
| 2002/0017383 A1 * | 2/2002 | Vincent | 165/204 |
| 2002/0139513 A1 * | 10/2002 | Natsume et al. | 165/42 |
| 2004/0016537 A1 * | 1/2004 | Nakamura et al. | 165/204 |
| 2004/0069483 A1 * | 4/2004 | Natsume et al. | 165/204 |

FOREIGN PATENT DOCUMENTS

| | | | |
|---|---|---|---|
| JP | 58-164417 | | 9/1983 |
| JP | 58164417 A | * | 9/1983 |
| JP | 7-025224 | | 1/1995 |
| JP | 2000-62442 | | 8/1998 |
| JP | 2001-18642 | | 1/2001 |
| JP | 2001-171333 | | 6/2001 |
| JP | 2001171333 A | * | 6/2001 |
| JP | 2003-285624 | | 10/2003 |

* cited by examiner

AUTOMOTIVE AIR CONDITIONING SYSTEM

BACKGROUND OF THE INVENTION

1. Field of the Invention

The present invention relates to an automotive air conditioning system.

2. Description of the Related Art

Conventionally, there is an automotive air conditioning system in which air, that has been conditioned or processed by an air conditioning unit disposed at a front part of a vehicle, is directed to a rear seat of the vehicle by providing a rear seat air discharging-assist fan within a rear seat duct (for example, Japanese Unexamined Patent Publication No. 2001-18642).

Figure 3:
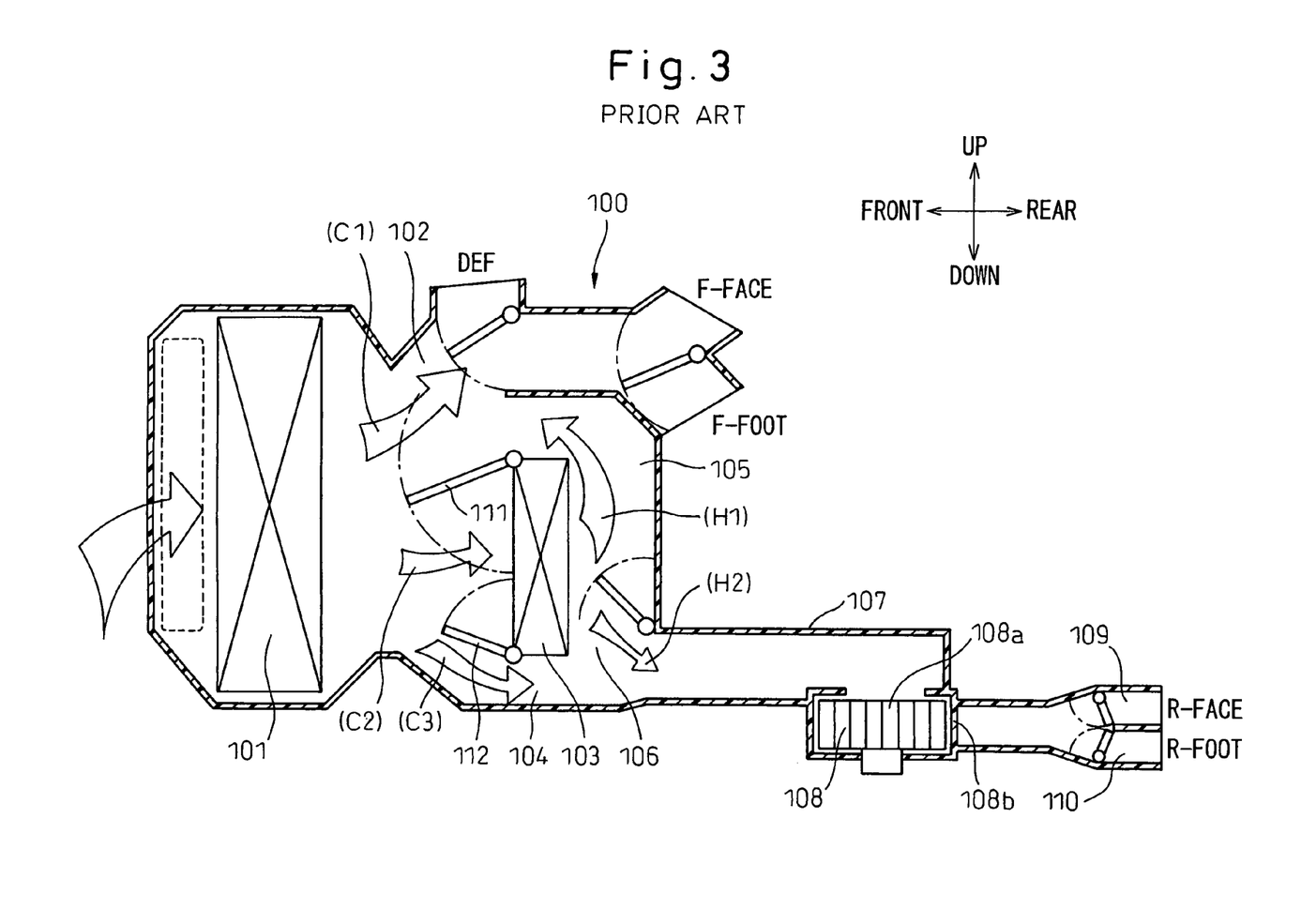
FIG. 3 is a drawing showing the configuration of a conventional automotive air conditioning system.

FIG. 3 is an exemplary drawing that shows a typical example of a conventional air conditioning system configuration. Cooled air, resulting from air that has been sent into an automotive air conditioning system by a main blower and which has passed through an evaporator provided in an air conditioning unit 100, is divided into a flow of cooled air (C1) which flows along a front-seat side cooled air flow path 102, a flow of cooled air (C2) which becomes heated air by being heated by a heater core 103 and a flow of cooled air (C3) which flows along a rear-seat side cooled air flow path 104 by means for air mixing doors 111, 112, and a flow of heated air, resulting from the cooled air that has passed through the heater core 103, is then divided into a flow of heated air (H1) which flows along a front-seat side heated air flow path 105 and a flow of heated air (H2) which flows along a rear-seat side heated air flow path 106.

The cooled air (C3) which has flowed through the rear-seat side cooled air flow path 104 and the heated air (H2) which has flowed through the rear-seat side heated air flow path 106 are mixed together within a rear seat duct 107, which is provided below the air conditioning unit 100 in such a manner as to reach from a lower opening 111 to the rear-seat side of the vehicle, is drawn into an inlet 108a of a rear seat air discharging-assist fan 108 and is discharged outwardly from an outlet 108b of the rear seat air discharging-assist fan 108 towards a rear-seat side face opening 109 for a rear-seat side face level area and a rear-seat side foot opening 110 for a rear-seat side foot level area which are both provided at a distal end of the rear seat duct 107.

Note that the rear-seat side face opening 109 and the rear-seat side foot opening are openings to which ducts connecting to a rear-seat side face outlet and a rear-seat side foot outlet, which are both not shown, are connected.

Then, the rear seat air discharging-assist fan 108 is such as to produce, in the air flow that has passed through the air conditioning unit 100, a momentum which has been lost due to a pressure loss occurring during the passage of air through the same unit. By means of the rear seat air discharging-assist fan 108, a sufficient air flow can be provided for the conditioned air that is discharged from the rear-seat side FACE opening 109 and the rear-seat side FOOT opening 110.

In this configuration, as the rear seat air discharging-assist fan 108 is disposed in the rear seat duct 107, there is a problem that the rear seat duct 107 is enlarged, which limits the position where the rear seat duct 107 can be installed on a vehicle floor.

SUMMARY OF THE INVENTION

The present invention was made in view of the problem, and an object thereof is to provide an automotive air conditioning system which can prevent the enlargement of a rear seat duct due to the disposition of a rear seat air discharging-assist fan.

With a view to attaining the object, according to one aspect of the invention, there is provided an automotive air conditioning system comprising a primary blower disposed at a front part of a vehicle having a passenger compartment constituted by a front-seat side space and a rear-seat side space; a case (1a) disposed in the front part of the vehicle in such a manner that air is caused to flow from one end to the other end thereof by means of the primary blower and having a lower opening (1f) which is opened therein at a lower portion at the other end thereof; a heat exchanger disposed within the case (1a); a scroll case (18c) disposed below the case (1a) and having opened therein an outlet (18b) and an inlet (18a) connecting to the lower opening (1f); an centrifugal fan (18d) accommodated in the scroll case (18c) and having a rotating shaft which is oriented in a substantially vertical direction; a secondary blower having a driving means (18e) for driving the centrifugal fan (18d); and a rear seat duct (19) connected to the outlet (18d) and communicating with the rear-seat side space.

As the secondary blower (18) is disposed below the case (1a), the rear seat duct (19) does not have to be enlarged, which would otherwise occur due to the incorporation of the secondary blower (18) therein, whereby the enlargement of the rear seat duct (19) can be prevented.

Incidentally, in general, a inlet flow path along which air drawn in is caused to flow needs to be connected to an inlet of a blower. Then, according to the invention, the heat exchanger is a heat exchanger (6) for heating air, a rear-seat side heated air flow path (11), along which air that has passed through the heating heat exchanger (6) is caused to flow, and a rear-seat side cooled air flow path (7), along which air that has bypassed a lower side of the heating heat exchanger (6) is caused-to flow, are provided below the heating heat exchanger (6), the lower opening (1f) is made to open at a position facing a lower portion of the heating heat exchanger (6), and the inlet (18a) draws in either air that flows along the rear-seat side heated air flow path (11) or air that flows along the rear-seat side cooled air flow path (7), or both.

By this configuration, a portion, below the heating heat exchanger (6) where the rear-seat side heated air flow path (11) and the rear-seat side cooled air flow path (7) are provided, can also be used as an inlet path for the secondary blower (18), whereby air within the case (1a) can be drawn in well from the inlet (18a).

In addition, according to the invention, a rear-seat side air mixing means (4) is provided for dividing a flow of air sent into the case (1a) by the primary blower into a flow of air that passes through the rear-seat side cooled air flow path (7) and a flow of air that is heated by the heating heat exchanger (6).

Additionally, according to the invention, front-seat side openings (14, 15, 16, 17) communicating with the front-seat side space are opened above the other end of the case (1a), a front-seat side heated air flow path (10) along which air that has passed through the heating heat exchanger (6) flows and a front-seat side cooled air flow path (5) which bypasses the heating heat exchanger (6) on an upper side thereof are provided above the heating heat exchanger (6), and a front-seat side air mixing means (3) for dividing a flow of air sent into the case (1a) by means of the primary blower into a flow of air that passes through the front-seat side cooled air flow path (5) and a flow of air that is heated by the heating heat exchanger (6).

Furthermore, according to the invention, a rear-seat side heated air flow path closing means (9) is provided for closing the rear-seat side heated air flow path (11).

By this configuration, the temperature of air that is induced onto the front-seat side space and the temperature of air that is induced into the rear-seat side space can be controlled independently of each other.

In addition, according to another aspect of the invention, there is provided an automotive air conditioning system comprising; a primary blower disposed at a front part of a vehicle having a passenger compartment constituted by a front-seat side space and a rear-seat side space; a case (1a) disposed at the front part of the vehicle in such a manner that air is caused to flow from one end to the other end thereof by the primary blower; a scroll case (18c) disposed below the case (1a) and having opened therein an inlet (18a) which draws in air within the case (1a) and an outlet (18b); a centrifugal fan (18d) accommodated in the scroll case (18c) and having a rotating shaft which is oriented in a substantially vertical direction; a secondary blower (18) having a driving means (18e) for driving the centrifugal fan (18d); and a rear seat duct (19) connected to the outlet (18b) and communicating with the rear-seat side space.

Note that, when used in describing the respective means herein, the substantially vertical direction does not mean a vertical direction strictly but means that the respective means may be slightly inclined from the vertical direction.

The present invention may be more fully understood from the description of preferred embodiments of the invention set forth below together with the accompanying drawings.

DESCRIPTION OF PREFERRED EMBODIMENTS

First Embodiment

A first embodiment according to the present invention will be described below by reference to FIGS. 1 and 2.

Figure 1:
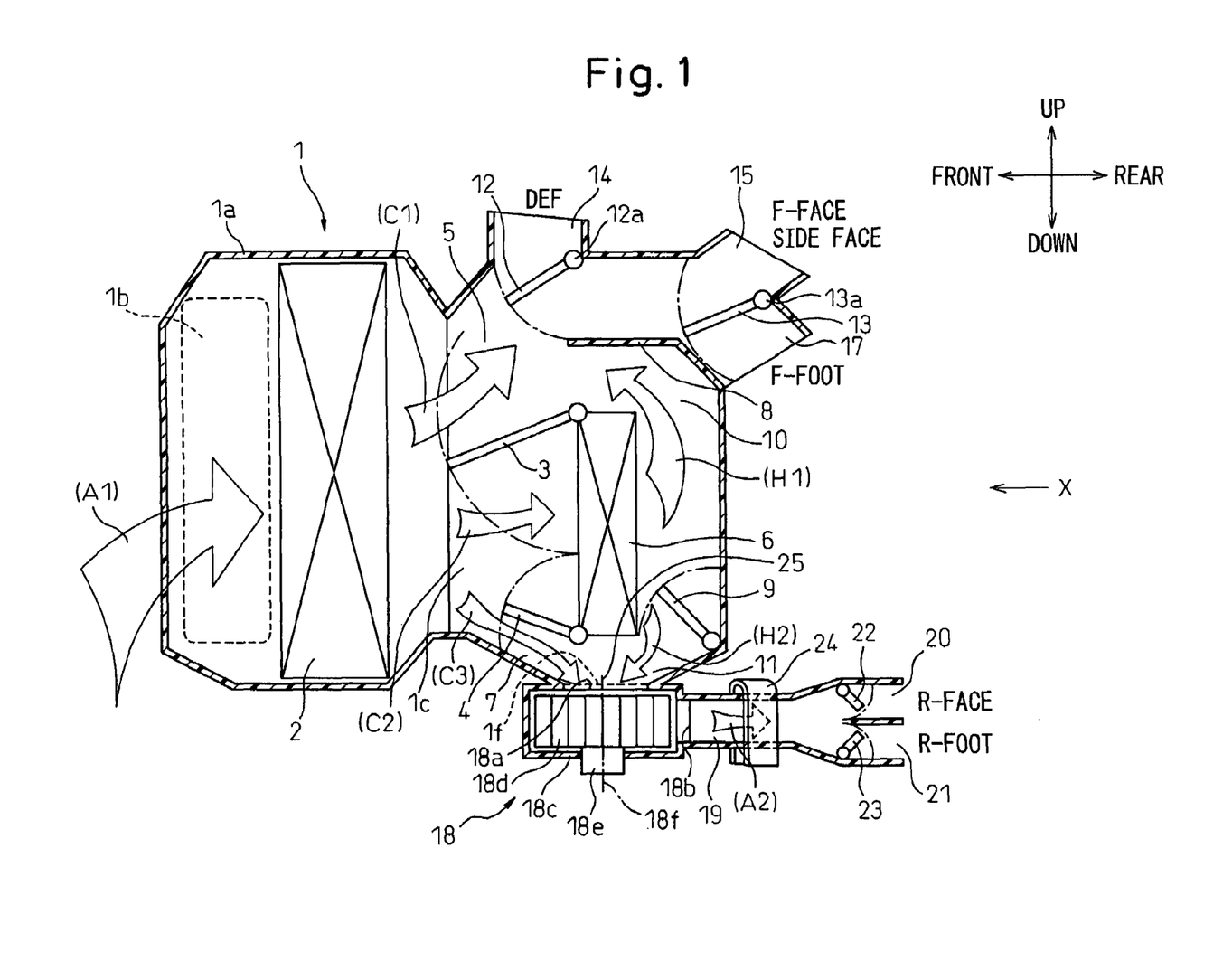
FIG. 1 is a longitudinally vertical sectional view of an automotive air conditioning system 1 according to a first embodiment of the invention.

FIG. 1 is an exemplary view showing the configuration of a first embodiment of the invention. An automotive air conditioning system 1 is disposed in a portion below an instrument panel provided in a front-seat side space of a vehicle, not shown, and is configured such that air is induced from a main blower, not shown, which is disposed on a front passenger-seat side (in the case of a right-hand drive vehicle, on a left-hand side as viewed in a transverse direction of the vehicle) so as to be discharged from front-seat side face outlets, side face outlets, DEF (defrost) outlets, front-seat side FOOT outlets, a rear-seat side face outlet and a rear-seat side foot outlet into three air conditioning zones such as a driver's-seat side space and a front passenger-seat side space, which are both in the front-seat side space, and a rear-seat side space while the temperatures of the air so discharged are controlled independently.

The main blower, not shown, is such as to select air to be drawn in from outside air induction ports, not shown, which communicate with an exterior portion of the vehicle and inside air induction ports, also not shown, which communicate with the interior of a passenger compartment by means of an inside air/outside air selector door to force air (A1) into an air inlet 1b opened in an air conditioning case 1a of the automotive air conditioning system 1 at a position situated on the front passenger-seat side in the front part of the vehicle by a main centrifugal fan, not shown, accommodated in a main scroll case, also not shown.

Figure 2:
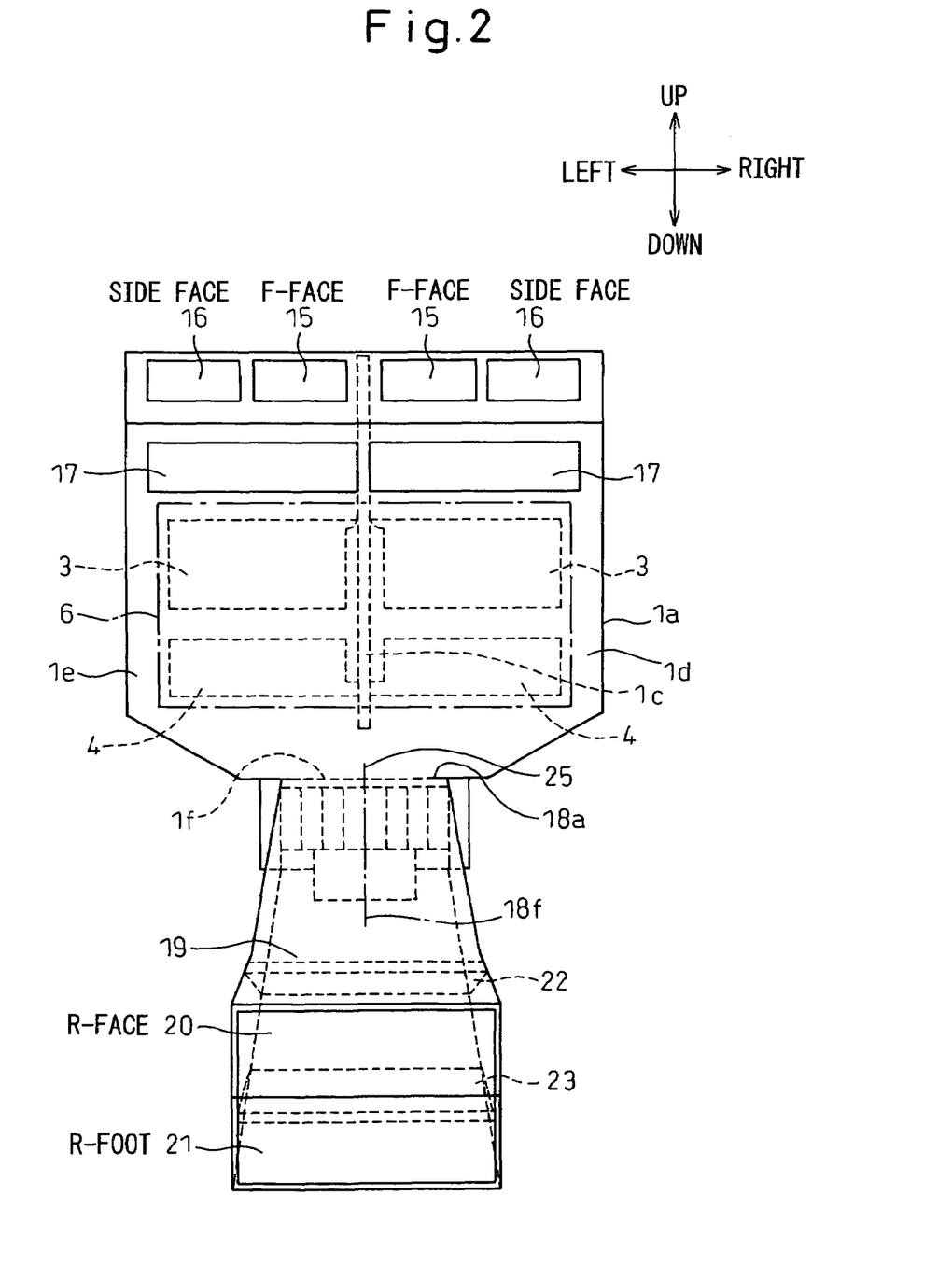
FIG. 2 is a view of the automotive air conditioning system 1 of the invention as viewed in a direction indicated by an arrow X shown in FIG. 1.

FIG. 2 is an exemplary view of the automotive air conditioning system 1 as viewed in a direction indicated by an arrow X shown in FIG. 1.

In the air conditioning case 1a, a downstream side of an evaporator 2 is divided into two left and right flow paths such as a driver's-seat side flow path 1d and a front passenger-seat side flow path 1e by means of a partition plate 1c, and front-seat side face openings 15, side face openings 16 and front-seat side foot openings 17, which will be described later on, are provided in the respective flow paths.

In addition, a lower opening 1f is provided at a lower end portion of the driver's-seat side flow path 1d and the front passenger-seat side flow path 1e. An inlet 18a of a rear seat air discharging-assist fan 18, which will be described later on, is connected to the lower opening 1f.

The conditioned air discharged into the driver's-seat side air conditioning zone, the conditioned air discharged into the front passenger-seat side air conditioning zone and the conditioned air discharged into the rear-seat side air conditioning zone are controlled so as to reach target discharged air temperatures which are calculated by an ECU (electronic control unit).

To be specific, the temperatures of the conditioned air discharged into the driver's-seat side air conditioning zone and the conditioned air discharged into the front passenger-seat side air conditioning zone are controlled by two left and right front-seat side air mixing doors 3 which are provided in the driver's-seat side flow path 1d and the front passenger-seat side flow path 1e, respectively and are rotated independently from each other, and the temperature of the conditioned air discharged into the rear-seat side air conditioning zone is controlled by a rear-seat side air mixing door 4 which is rotated as an integral unit across the partition plate 1c.

While only one of the driver's-seat side flow path 1d and the front passenger-seat side flow path 1e will be described below, the configuration of the other will be identical.

Air (A1) sent into the air inlet 1b is cooled when the air passes through the evaporator 2 disposed downstream (rearward in a longitudinal direction of the vehicle) of the air inlet 1b.

The evaporator 2 is such as to be made up of a number of flat tubes which are disposed to be stacked one on another with a corrugated fin being interposed between any two adjacent stacked flat tubes and are then brazed together, each of the flat tubes being constructed by combining two sheets metal of aluminum or the like together, and the evaporator 2 constitutes a known refrigeration cycle together with a compressor, a condenser, an expansion valve and the like, none of which is shown in the drawing. Then, the evaporator 2 functions as a heat exchanger in which a refrigerant of the refrigeration cycle evaporates while taking latent heat away from the air passing thereover, whereby the air is cooled and dehumidified.

The air so cooled when it has passed through the evaporator 2 is then caused to be divided into a flow of cooled air (C1) which bypasses the heater core 6 on an upper side thereof and flows along a front-seat side cooled air flow path 5, a flow of cooled air (C2) which passes through the heater core 6 so as to be heated to thereby become heated air and a flow of cooled air (C3) which bypasses the heater core 6 on a lower side thereof to thereby flow along a rear-seat side cooled air flow path 7 by the front-seat side air mixing doors 3 and the rear-seat side air mixing door 4.

The front-seat side cooled air flow path 5 is a flow path which guides air bypassing the heater core 6 on the upper side thereof into openings (front-seat side face outlets, side face outlets, DEF (defrost) outlets and front-seat side foot outlets) which communicate with the front-seat side space.

The rear-seat side cooled air flow path 7 is a flow path which passes air that has bypassed the heater core 6 on the lower side thereof through a lower end space 25, which is a space below the heater core 6, so as to be guided into the lower opening 1f.

Note that the lower opening 1f is made to open below the lower end space 25 and is provided in such a manner as to face a lower portion of the heater core 6. An inlet 18a of a rear seat air discharging-assist fan 18 is connected to the lower opening 1f.

The heater core 6 is such as to be made up of a number of flat tubes which are disposed to be stacked one on another with a corrugated fin being interposed between any two adjacent stacked flat tubes and are then brazed together, each of the flat tubes being constructed by welding sheets metal of aluminum or the like in such a manner as to form a flat cross-sectional shape, and engine coolant which is heated to high temperatures (heated coolant) is caused to flow into the interior of the heater core 6, so that the heater core 6 functions as an heat exchanger for heating air using the heated engine coolant as a heat source.

The front-seat side air mixing door 3 is one of two plate-like doors which are controlled to be rotated independently from each other about a rotating shaft fixed to an upper end of the heater core 6 across the partition plate 1c and is such as to function to divide the flow of cooled air, which has passed over an upper portion of the evaporator 2, into a flow of cooled air (C1) which flows along the front-seat side cooled air flow path 5 and a flow of cooled air (C2) which passes through the heater core 6 so as to be heated to thereby become heated air so as to realize a target discharged air temperature that is calculated by the ECU.

The rear-seat side air mixing door 4 is a door which is controlled to be rotated as an integral unit about a rotating shaft fixed to a lower end of the heater core 6 across the partition plate 1c and functions to divide the flow of cooled air, which has passed over a lower portion of the evaporator 2, into a flow of cooled air (C2) which is heated when it passes through the heater core 6 so as to become heated air and a flow of cooled air (C3) which flows along the rear-seat side cooled air flow path 7.

The flow of heated air which has passed through the heater core 6 is then divided by a heated air guide 8 and a rear-seat side heated air flow path opening/closing door 9 into a flow of heated air (H1) which flows along a front-seat side heated air flow path 10 and a flow of heated air (H2) which flows along a rear-seat side heated air flow path 11.

The front-seat side heated air flow path 10 is a flow path which merges the flows of heated air which were divided by the heated air guide 8 and the rear-seat side heated air flow path opening/closing door 9 into a flow which flows into the front-seat side cooled air flow path 5.

The rear-seat side heated air flow path 11 is a flow path which allows the flows of heated air which were divided by the heated air guide 8 and the rear-seat side heated air flow path opening/closing door 9 to pass through the lower end space 25 to thereby be guided into the lower opening 1f.

The flow of cooled air (C1) flowing along the front-seat side cooled air flow path 5 and the flow of heated air (H1) flowing along the front-seat side heated air flow path 10 are mixed together so as to produce a flow of conditioned air that is conditioned to a target discharged air temperature calculated by the ECU. Then, the conditioned air, which is conditioned to the target discharged air temperature, is then sent into DEF openings 14, the front-seat side face openings 15, the side face openings 16 and the front-seat side foot openings 17 by a DEF (defrost) door 12, a front face/foot door 13 and a side face door, which is not shown, in order to constitute a discharge mode in accordance with the aforesaid discharged air temperature.

The DEF door 12 is a door which is controlled to be rotated as an integral unit about a rotating shaft 12a across the partition plate 1c and is such as to rotate to open or close the DEF openings 14.

The front-seat side face/foot door 13 is a door which is controlled to be rotated as an integral unit about a rotating shaft 13a across the partition plate 1c and is such as to rotate to open either the front-seat side face openings 15 or the front-seat side foot openings 17 or both.

The side face door, not shown, is a door which is controlled to be rotated as an integral unit about a rotating shaft thereof across the partition plate 1c and is such as to rotate to open or close the side face openings 16.

The DEF openings 14 are arranged within a passenger compartment, not shown, such that a DEF duct, not shown, which communicates with the DEF outlets through which the conditioned air is discharged towards a front wind screen is connected thereto.

The front-seat side face openings 15 are arranged within the passenger compartment, not shown, such that a front-seat side face duct, not shown, which communicates with the front-seat side face outlets through which the conditioned air is discharged towards the upper half bodies of the occupants seated on the front seats, is connected thereto.

The side face openings 16 are arranged within the passenger compartment, not shown, such that a side face duct, not shown, which communicates with the side face outlets through which the conditioned air is discharged towards sides of the upper half bodies of the occupants seated on the front seats, is connected thereto.

The front-seat side foot openings 17 are arranged within the passenger compartment, not shown, such that a front-seat side foot duct, not shown, which communicates with the front-seat side foot outlets through which the conditioned air is discharged towards the lower half bodies of the occupants seated on the front seats is connected thereto.

Note that the discharge mode in accordance with the target discharged air temperature denotes any of a DEF mode in which the DEF openings 14 are opened so as to discharge the conditioned air from the DEF outlets toward the front wind screen to prevent the frosting of the front wind screen, a front-seat side face mode in which the front-seat side face openings 15 and the side face openings 16 are opened so as to discharge the conditioned air from the front-seat side face outlets and the side face outlets towards the upper half bodies of the occupants seated on the front seats, a front-seat side foot mode in which the front-seat side foot openings 17 are opened so as to discharge the conditioned air towards the lower half bodies of the occupants seated on the front seats, a B/L (Bi-Level) mode in which the front-seat side face openings 15 and the front-seat side foot openings 17 are both opened so as to discharge the conditioned air from the front-seat side face outlets and the front-seat side foot outlets towards the upper and lower half bodies of the occupants seated on the front seats and a F/D (foot/DEF) mode in which the DEF openings 14 and the front-seat foot openings 17 are both opened so as to discharge the conditioned air from the DEF outlets and the front-seat side foot outlets towards the front wind screen and the lower half bodies of the occupants seated on the front seats, and as the DEF door 12, the front-seat side face/foot door 13 and a side face door, which is not shown, are controlled to be rotated integrally in the driver's-seat side flow path 1d and the front passenger-seat side flow path 1e across the partition plate 1c, the discharge mode is determined in accordance with either of a target discharged air temperature in the driver's-seat side air conditioning zone and a target discharged air temperature in the front passenger-seat side air conditioning zone.

In contrast, after having passed through the lower end space 25 provided below the heater core 6 (at the lower end portions of the driver's-seat side flow path 1d and the front passenger-seat side flow path 1e), the flow of cooled air (C3), that has flowed through the rear-seat side cooled air flow path 7, and the flow of heated air (H2), that has flowed through the rear-seat side heated air flow path 11, are drawn into the inlet 18a of the rear seat air discharging-assist fan 18 which is connected to the lower opening 1f of the air conditioning case 1a for mixing, whereby an conditioned air of the target discharged air temperature is produced.

The rear seat air discharging-assist fan 18 is such as to incorporate a centrifugal fan 18d having a fan rotating shaft 18f oriented substantially in a vertical direction of the vehicle and a blower motor 18e for driving the centrifugal fan 18d in a scroll case 18c having the inlet 18a and an outlet 18b which are both opened therein.

The inlet 18a is connected to the lower opening 1f of the air conditioning case 1a and is an opening for taking the conditioned air in the lower end space 25 into the rear seat air discharging-assist fan 18.

The conditioned air drawn into the inlet 18a of the rear seat air discharging-assist fan 18 is discharged from the outlet 18b opened in the scroll case 18c so as to be sent into a rear seat duct 19.

A rear-seat side face opening 20 and a rear-seat side foot opening 21 are opened in a downstream end of the rear seat duct 19, and a rear-seat side face door 22 for closing the rear-seat side face opening 20 and a rear-seat side foot door 23 for closing the rear-seat side foot opening 21 are provided.

The rear-seat side face opening 20 is an opening to which a rear-seat side face duct, not shown, is connected which is disposed in the passenger compartment and which communicates with a rear-seat side face outlet, not shown, which discharges the conditioned air towards the upper half bodies of the occupants seated on the rear seat.

The rear-seat side foot opening 21 is an opening to which a rear-seat side foot duct, not shown, is connected which is disposed in the passenger compartment and which communicates with a rear-seat side foot outlet, not shown, which discharges the conditioned air towards the lower half bodies of the occupants seated on the rear seat.

The rear-seat side face door 22 is a plate-like door which is controlled to be rotated about a rotating shaft 22a disposed above the rear seat duct 19 and is such as to rotate to open and close the rear-seat side face opening 20.

The rear-seat side foot door 23 is a plate-like door which is controlled to be rotated about a rotating shaft 23a disposed below the rear seat duct 19 and is such as to rotate to open and close the rear-seat side foot opening 21.

The conditioned air sent into the rear seat duct 19 is divided into an airflow flowing into the rear-seat side face opening 20 and an airflow flowing into the rear-seat foot opening 21 by the rear-seat side face door 22 and the rear-seat side foot door 23 so as to produce a discharge mode in accordance with a target discharged air temperature calculated by the ECU, so that the divided airflows are discharged into the passenger compartment, which is not shown.

Note that the discharge mode in accordance with the target discharged air temperature denotes any of a rear-seat side face mode in which the rear-seat side face opening 20 is opened so that the conditioned air is discharged from the rear-seat side face outlet towards the upper half bodies of the occupants seated on the rear seat, a rear-seat side foot mode in which the rear-seat side foot opening 21 is opened so that the conditioned air is discharged from the rear-seat side foot outlet towards the lower half bodies of the occupants seated on the rear seat and a B/L mode in which the rear-seat side face opening 20 and the rear-seat side foot opening 21 are both opened so that the conditioned air is discharged from the rear-seat side face outlet and the rear-seat side foot outlet towards the upper and lower half bodies of the occupants seated on the rear seat.

Note that the ECU is a known calculation device to which various types of setting signals which are inputted from a control section provided on the instrument panel, not shown, and various types of detection signals which are inputted from a group of sensors placed inside and outside the passenger compartment, which is not shown, are inputted, and the ECU calculates target discharged air temperatures for the respective three driver's-seat side, front passenger-seat side and rear-seat side air conditioning spaces based on the setting signals and detection signals so inputted and controls the rotation of the doors.

Note that a floor bracket 24 for fixing the rear seat duct 19 to the vehicle floor is provided just behind the air conditioning case 1a.

Thus, according to the invention, as the inlet 18a provided in the scroll case 18c of the rear seat air discharging-assist fan 18 is connected to the lower opening 1f of the air conditioning case 1a in such a manner as to face the lower portion of the heater core 6, the rear seat air discharging-assist fan 18 does not have to be installed within the rear seat duct 19, whereby the enlargement of the rear seat duct 19 can be prevented.

In addition, the flow of heated air flowing along the rear-seat side heated air flow path 11 and the flow of cooled air flowing along the rear-seat side cooled air flow path 7 are diagonally drawn into the inlet 18a of the rear seat air discharging-assist fan 18 from the lower opening 1f after both the flows have passed through the space 25 below the heater core 6.

Namely, the lower end space 25 is also used as an inlet path for the rear seat air discharging-assist fan 18, thus obviating the necessity of providing a separate inlet path for the rear seat air discharging-assist fan 18.

In addition, as a fan rotating shaft 18f of the rear seat air discharging-assist fan 18 is oriented substantially in the vertical direction of the vehicle, the flow of cooled air (C3) flowing along the rear-seat side cooled air flow path 7 and the flow of heated air (H2) flowing along the rear-seat side heated air flow path 11, which are both guided into the lower end space 25 below the heater core 6, can be drawn thereinto with good balance and smoothly.

Additionally, as there are provided the front-seat side air mixing doors 3, the rear-seat side air mixing door 4 and the rear-seat side heated air flow path opening/closing door 9, the temperature of air induced into the front-seat side space and the temperature of air induced into the rear-seat side space can be controlled independently from each other.

Note that in the event that the rear seat air discharging-assist fan 18 is disposed in the rear seat duct 19, whereby the rear seat duct 19 is enlarged, there occurs a risk that there might be a problem that the enlarged rear seat duct 19 interferes with the floor bracket 24 which is provided just behind the air conditioning case 1a. In the present invention, however, as the rear seat air discharging-assist fan 18 is disposed below the air conditioning case 1a, whereby the enlargement of the rear seat duct 19 can be prevented, no such problem occurs.

Second Embodiment

Figure 4:
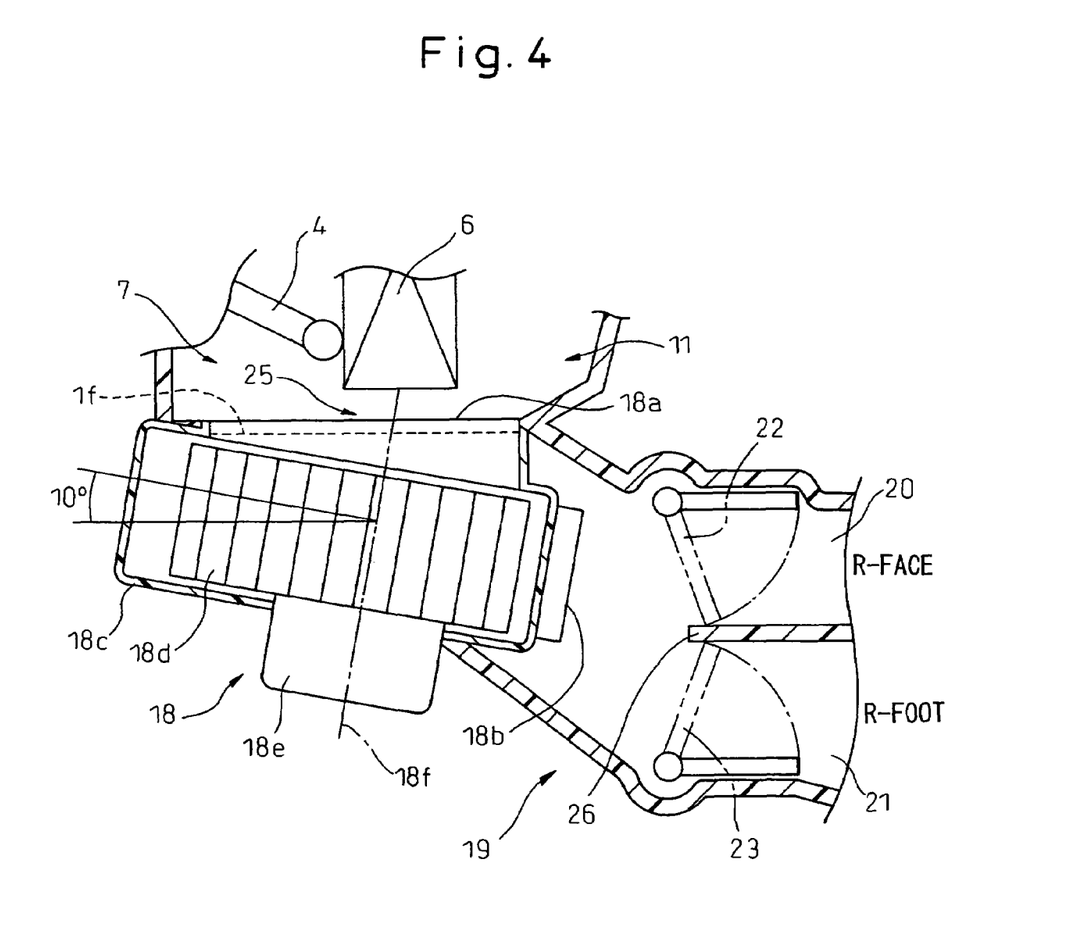
FIG. 4 is a drawing showing a rear seat air discharging-assist fan and a rear seat duct according to a second embodiment of the invention.

Next, a second embodiment of the invention will be described by reference to FIG. 4. FIG. 4 is a drawing showing a rear seat air discharging-assist fan 18 and a rear seat duct 19 according to the embodiment of the invention. Note that components and portions which are not shown in FIG. 4 are similar to those described in the first embodiment and, therefore, like reference numerals are given to components and portions which are similar to those of the first embodiment.

The rear seat duct 19 according to the embodiment is inclined downwardly from an outlet 18b of the rear seat air discharging-assist fan 18 towards the rear of the vehicle.

In this embodiment, as with the first embodiment, air is drawn in diagonally relative to an inlet 18a of the rear seat air discharging-assist fan 18. Due to this, a speed component of the air flow into the inlet 18a which is parallel with a fan rotating shaft 18f becomes small, and there exists a tendency that the peak of the speed distribution of the air discharged from the outlet 18b deviates slightly upward when compared with a case where air is drawn in from directly above the inlet 18a.

Furthermore, as the rear seat duct 19 inclines downwardly from the outlet 18b towards the rear of the vehicle and a rear-seat side face opening 20 and a rear-seat side foot opening 21 are divided vertically by a partition plate 26, there occurs a deviation in the flows of air which flow into the rear-seat side face opening 20 and the rear-seat side foot opening 21 due to the aforesaid tendency.

Therefore, in this embodiment, the fan rotating shaft 18f of the rear seat air discharging-assist fan 18 is inclined about 10 degrees towards the rear of the vehicle.

Then, according to the embodiment, a circularly annular rib is erected along the circumference of the inlet 18a in such a manner as to protrude upwardly from a scroll case 18c. This rib is set to protrude higher as it extends towards the rear of the vehicle, and when fitting in a lower opening 1f, the rib positions the lower opening 1f relative to the inlet 18a and allows the scroll case 18c to be inclined about 10 degrees towards the rear of the vehicle.

By this configuration, the peak of the speed distribution of air discharged from the outlet 18b is directed towards the partition plate 26 which separates the rear-seat side face opening 20 from the rear-seat side foot opening 21, so that there occurs no deviation in flows of air flowing into the rear-seat side face opening 20 and the rear-seat side foot opening 21.

Third Embodiment

Figure 5:
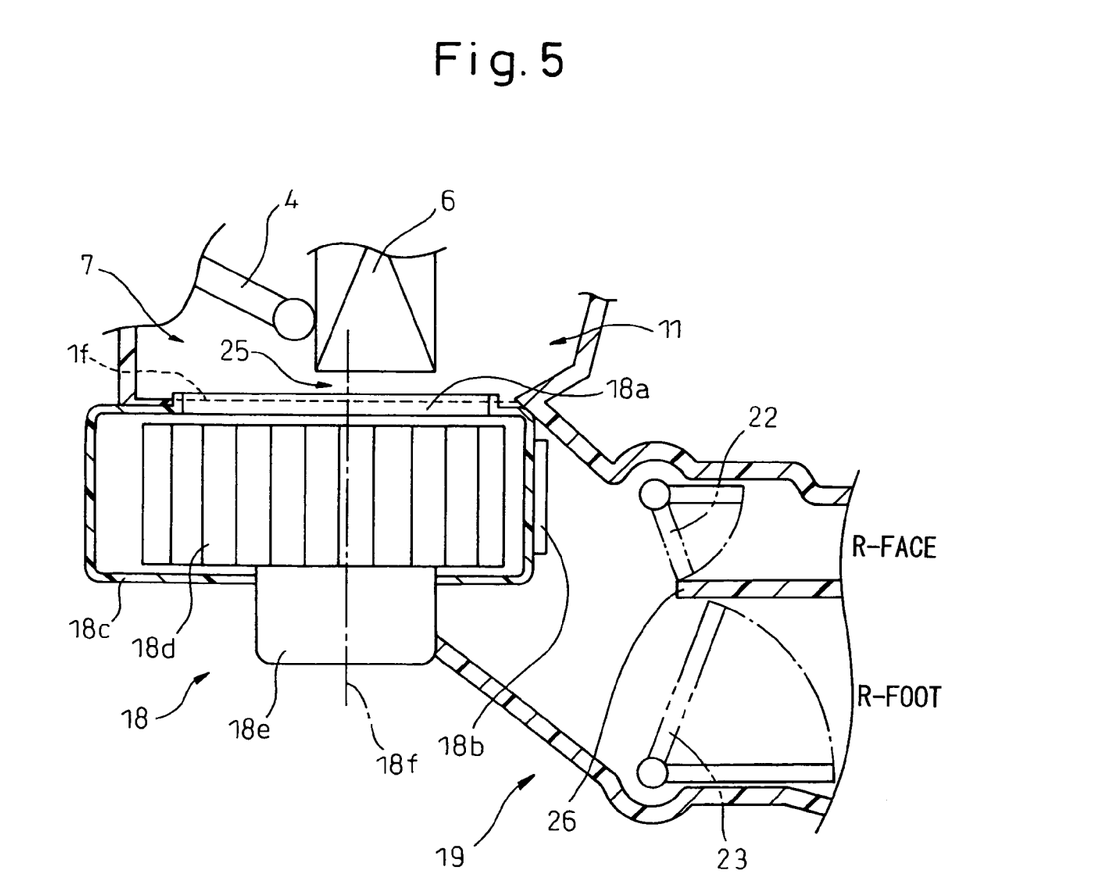
FIG. 5 is a drawing showing a rear seat air discharging-assist fan and a rear seat according to a third embodiment of the invention.

Next, a third embodiment will be described by reference to FIG. 5. FIG. 5 is a drawing showing a rear seat air discharging-assist fan 18 and a rear seat duct 19 according to the embodiment. Note that components and portions which are not shown in FIG. 5 are similar to those described in the first embodiment, and therefore, like reference numerals are given to components and portions which are like to those of the first embodiment.

While, in the second embodiment, the occurrence of deviation in the flows of air flowing into the rear-seat side face opening 20 and the rear-seat side foot opening 21 is prevented by the inclined fan rotating shaft 18f, in this embodiment, the position of a partition plate 26 which separates a rear-seat side face opening 20 from a rear-seat side foot opening 21 is displaced upwardly so as to reduce the width of the entrance of a flow path into the rear-seat side face opening 20, whereby the occurrence of deviations in the flows of air flowing into the rear-seat side face opening 20 and the rear-seat side foot opening 21 are prevented.

Note that, in this embodiment, a circularly annular rib is erected along the circumference of an inlet 18a in such a manner as to protrude upwardly from a scroll case 18c, and when fitting in a lower opening 1f, the rib positions the lower opening 1f relative to the inlet 18a.

Fourth Embodiment

Figure 6:
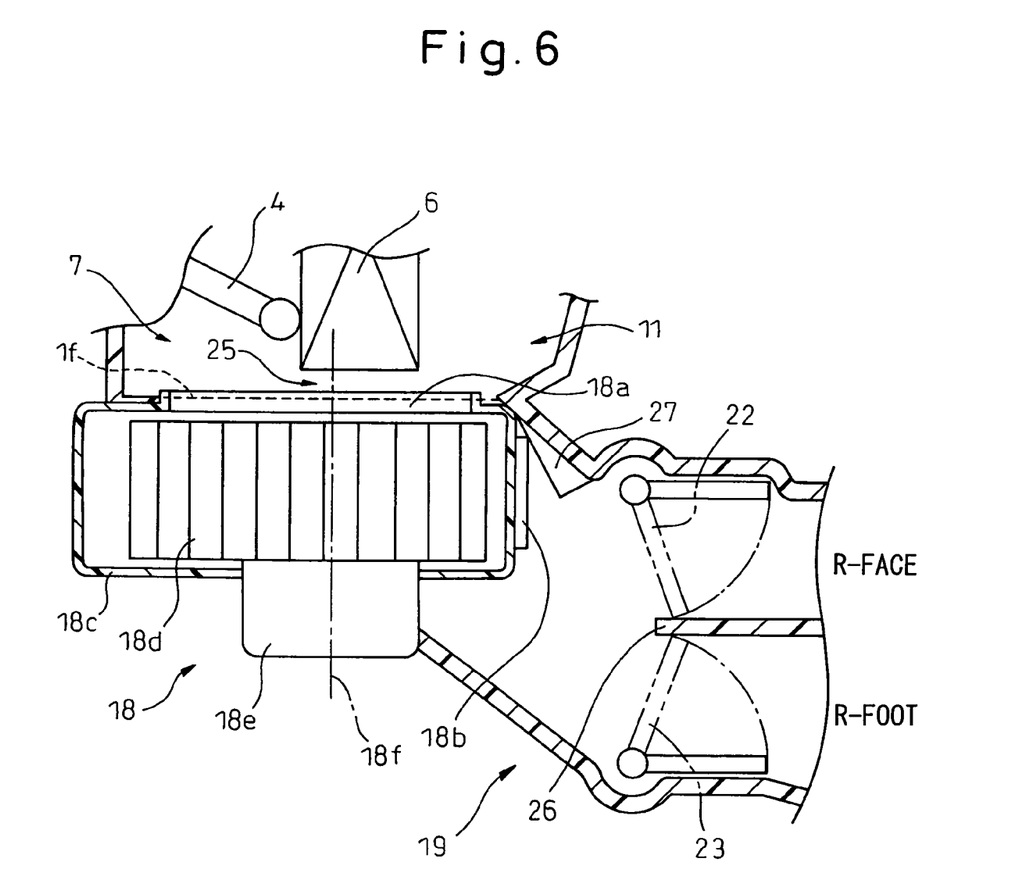
FIG. 6 is a drawing showing a rear seat air discharging-assist fan and a rear seat according to a fourth embodiment of the invention.

Next, a fourth embodiment will be described with reference to FIG. 6. FIG. 6 is a drawing showing a rear seat air discharging-assist fan 18 and a rear seat duct 19 according to the embodiment. Note that components and portions which are not shown in FIG. 6 are similar to those described in the first embodiment, and therefore, like reference numerals are given to components and portions which are similar to those of the first embodiment.

While, in the second embodiment, the occurrence of deviation in the flows of air flowing into the rear-seat side face opening 20 and the rear-seat side foot opening 21 is prevented by the inclined fan rotating shaft 18f, in this embodiment, a guide 27 for directing the peak of the speed distribution of air discharged from an outlet 18b towards the direction of a partition plate 26 which separates a rear-seat side face opening 20 from a rear-seat side foot opening 21 is provided on an upstream side of the partition plate 26 in a rear seat duct 19, whereby the occurrence of deviations in flows of air flowing into the rear-seat side face opening 20 and the rear-seat side foot opening 21 are prevented.

Other Embodiments

In the first to fourth embodiments that have been described heretofore, while the lower opening 1f is provided in the air conditioning case 1a and the inlet 18a of the rear seat air discharging-assist fan 18 is connected to the lower opening 1f, the present invention is not limited thereto, and the air conditioning case 1a and the scroll case 18c may be molded into a single unit, provided that the rear seat air discharging-assist fan 18 remains disposed below the air conditioning case 1a.

In addition, in the first to fourth embodiments that have been described heretofore, while the DEF door 12, the front-seat side face/foot door 13 and the side face door, not shown, are made to rotate together about the rotating shafts across the partition plate 1c, the present invention is not limited thereto, and the DEF door 12, the front-seat side face/foot door 13 and the side face door, not shown, may be made to rotate independently so as to produce different discharge modes of the driver's seat-side flow path 1d and of the front passenger seat-side flow path 1e.

While the invention has been described by reference to the specific embodiments chosen for purposes of illustration, it should be apparent that numerous modifications could be made thereto, by those skilled in the art, without departing from the basic concept and scope of the invention.

The invention claimed is:

1. An automotive air conditioning system comprising:
   a primary blower disposed at a front part of a vehicle having a passenger compartment constituted by a front-seat side space and a rear-seat side space;
   a primary case disposed in the front part of the vehicle in such a manner that air is caused to flow from one end to the other end thereof by means of the primary blower and having a lower opening which is opened at a lower portion of the primary case, the lower opening being formed in a bottom face of the primary case;
   an evaporator disposed in the primary case for cooling air that passes therethrough;
   a heating heat exchanger for heating air that passes therethrough disposed within the primary case downstream of the evaporator;
   a bypass passage within the primary case to allow air flow to bypass the heating heat exchanger disposed directly below the heating heat exchanger, the lower, opening being disposed directly below the bypass passage;
   a scroll case disposed below the primary case and having opened therein an outlet and an inlet connecting to the lower opening, the inlet being provided on an upper face of the scroll case;
   an centrifugal fan accommodated in the scroll case and having a rotating shaft which is oriented in a substantially vertical direction;
   a secondary blower having driving means for driving the centrifugal fan; and
   a rear seat duct connected to the outlet and communicating with the rear-seat side space.

2. An automotive air conditioning system as set forth in claim 1 wherein a rear-seat side heated air flow path along which air that has passed through the heating heat exchanger is caused to flow, and a rear-seat side cooled air flow path along which air that has bypassed a lower side of the heating heat exchanger is caused to flow, are provided below the heating heat exchanger, wherein the lower opening is made to open at a position facing a lower portion of the heating heat exchanger, and wherein the inlet draws in either air that flows along the rear-seat side heated air flow path or air that flows along the rear-seat side cooled air flow path, or both.

3. An automotive air conditioning system as set forth in claim 2, wherein a rear-seat side air mixing means is provided for dividing a flow of air sent into the primary case by the primary blower into a flow of air that passes through the rear-seat side cooled air flow path and a flow of air that is heated by the heating heat exchanger.

4. An automotive air conditioning system as set forth in claim 3, wherein front-seat side openings communicating with the front-seat side space are opened above the other end of the primary case, wherein a front-seat side heated air flow path along which air that has passed through the heating heat exchanger flows and a front-seat side cooled air flow path which bypasses the heating heat exchanger on an upper side thereof are provided above the heat exchanger, and wherein front-seat side air mixing means for dividing a flow of air sent into the primary case by means of the primary blower into a flow of air that passes through the front-seat side cooled air flow path and a flow of air that is heated by the heating heat exchanger.

5. An automotive air conditioning system as set forth in claim 4, wherein a rear-seat side heated air flow path opening/closing means is provided for closing the rear-seat side heated air flow path.

6. The automotive air conditioning system as set forth in claim 1, wherein the centrifugal fan is disposed directly below the bypass passage.

7. The automotive air conditioning system as set forth in claim 1, wherein the rotating shaft defines an axis of rotation extending through the heating heat exchanger.

8. The automotive air conditioning system as set forth in claim 1, wherein the primary case defines a front-seat side cooled air flow path which guides air bypassing an upper side of the heat exchanger into openings which communicate with the front-seat side space and the scroll case and the centrifugal fan are disposed below the front-seat side cooled air flow path.

9. The automotive air conditioning system as set forth in claim 1, wherein the air conditioning case defines a front-seat side cooled air flow path which guides air bypassing an upper side of the heating heat exchanger into openings which communicate with the front-seat side space and the secondary case and the secondary blower are disposed below the front-seat side cooled air flow path.

10. An automotive air conditioning system comprising:
    a primary blower disposed at a front part of a vehicle having a passenger compartment constituted by a front-seat side space and a rear-seat side space;
    a primary case disposed at the front part of the vehicle in such a manner that air is caused to flow from one end to the other end thereof by the primary blower;
    an evaporator disposed in the primary case for cooling air that passes therethrough;
    a heating heat exchanger for heating air that passes therethrough disposed within the primary case downstream of the evaporator;
    a scroll case disposed below the primary case, the scroll case having an inlet which draws in air from the primary case and an outlet, the inlet of the scroll case being provided on an upper face of the scroll case, the inlet drawing the air from the primary case through a lower opening on a bottom face of the primary case;
    a bypass passage within the primary case to allow air flow to bypass the heating heat exchanger disposed directly below the heating heat exchanger, the lower opening being disposed directly below the bypass passage;
    a centrifugal fan accommodated in the scroll case and having a rotating shaft which is oriented in a substantially vertical direction;
    a secondary blower having a driving means for driving the centrifugal fan; and
    a rear seat duct connected to the outlet and communicating with the rear-seat side space.

11. An automotive air conditioning system comprising:
    an air conditioning case equipped with an evaporator and a heating heat exchanger in an interior thereof, the heating heat exchanger being disposed downstream of the evaporator, the air conditioning having an air blend area and having defined therein a plurality of openings communicating with a passenger compartment of a vehicle;
    a primary blower for sending air into the air conditioning case;
    a secondary blower disposed in a secondary case, the secondary blower having an inlet which is open to the interior of the air conditioning case and adapted to draw in both a flow of air that has not passed through the heating heat exchanger and a flow of heated air that has passed through the heating heat exchanger, the inlet being open to the interior of the air conditioning case through a lower opening in a bottom face of the air conditioning case and an upper opening in an upper face of the secondary case; a bypass passage within the air conditioning case to allow air flow to bypass the heating heat exchanger disposed directly below the heater core, the lower opening being disposed directly below the bypass passage; and a duct connecting to an air outlet of the secondary blower.

12. An automotive air conditioning system as set forth in claim 11, wherein the inlet is open to the interior of the case from an upstream side to a downstream side of the heating heat exchanger.

13. The automotive air conditioning system as set forth in claim 11, wherein the secondary blower is disposed directly below the bypass passage.

14. The automotive air conditioning system as set forth in claim 11, wherein the secondary blower has a rotating shaft having an axis of rotation that extends through the heating heat exchanger.

15. An automotive air conditioning system comprising:

a primary blower for sending air into an air conditioning case;

an evaporator disposed in the air conditioning case for cooling air that passes therethrough;

a heater core disposed downstream of the evaporator for heating air that passes therethrough;

a defroster opening defined within the air conditioning case and communicating with a defroster outlet through which air is discharged towards a window glass inside a passenger compartment of a vehicle;

a foot opening defined within the air conditioning case and communicating with a foot outlet through which air is discharged towards the lower half bodies of front seat occupants in the passenger compartment;

a face opening defined within the air conditioning case and communicating with a face outlet through which air is discharged towards the upper half bodies of the front seat occupants in the passenger compartment;

a rear duct communicating with a rear outlet through which air is discharged towards rear seat occupants in the passenger compartment;

a lower opening defined within a bottom face of the air conditioning case so that a flow of air that has passed through the evaporator and a flow of air that has passed through the heater core are allowed to flow therein on a downstream side of the evaporator below the heater core; a bypass passage within the air conditioning case to allow air flow to bypass the heater core disposed directly below the heater core, the lower opening being disposed directly below the bypass passage; and a secondary blower disposed in a secondary case which draws in air from the lower opening and sends the drawn air into the rear duct, the secondary case defining an upper opening on an upper face of the secondary case in communication with the lower opening of the air conditioning case.

* * * * *